E. K. Dutton.
Liquid Measure.

Nº 59,761.          Patented Nov. 20, 1866.

Witnesses:
Wm Albert Steel
S. K. Hoxsie Godwin

Inventor:
E. R. Dutton
By his Atty
H. Howson

United States Patent Office.

IMPROVEMENT IN APPARATUS FOR MEASURING LIQUIDS.

E. K. DUTTON, OF MANCHESTER, ENGLAND.

Letters Patent No. 59,761, dated November 20, 1866.

SPECIFICATION.

TO ALL WHOM IT MAY CONCERN:

Be it known that I, E. K. DUTTON, of Manchester, Lancaster county, England, have invented an Improved Apparatus for Measuring and indicating the flow of Fluids, and I do hereby declare the following to be a full, clear, and exact description of the same, reference being had to the accompanying drawing and to the letters of reference marked thereon:

My invention is designed for the purpose of measuring and indicating the amount of liquid passing from one vessel to another, and the improvement consists of a novel construction and arrangement of mechanism, which may be used as a tap for the purpose of measuring the flow of liquid passing from a cask or reservoir. The plug of this tap has a passage or thoroughfare so constructed within it that when one-half or other portion of a turn is given to the plug by means of a handle, to which it is attached, the liquid shall flow from the cask or reservoir to which the tap is connected, through the thoroughfare, into a receiver of a certain given capacity, the air contained in the said receiver being expelled through a tube or passage into a hollow chamber of a capacity proportioned to the measuring chamber or receiver; when the receiver is full, the liquid continues to flow through the air tube, or through another tube to be hereafter described, until a sufficient quantity has occupied a portion of the air-chamber sufficient to produce an equilibrium or balance of pressure between the air and the liquid, at which time the liquid may be withdrawn from the tap by giving the plug a sufficient portion of a turn, or rotation, to reverse the passage, or passages, so as to close the communication with the cask or reservoir, and open a communication between the measuring receiver and the spout of the tap. The liquid in the air-chamber is held in suspension during the time the receiver is discharging itself, but during the filling it is connected by a tube with the inlet thoroughfare, which maintains the equilibrium by adjusting the quantity of liquid contained in the air-chamber. Each complete revolution of the plug of the tap fills and empties the measuring receiver, or the plug may be caused to reciprocate as is usual in ordinary cocks, the number of such revolutions, or reciprocations, being registered by any ordinary arrangement of indicating apparatus connected to the plug, or by the arrangement shown in my drawings. The above-described tap is suitable for measuring spirits, wines, &c., or any other liquors, and may be adapted to the ordinary beer engine, or to a modification thereof, in which one stroke or "pull" of the beer engine is caused to fill and empty the measuring receptacle.

Referring to the drawing attached hereunto,

Figure 1:
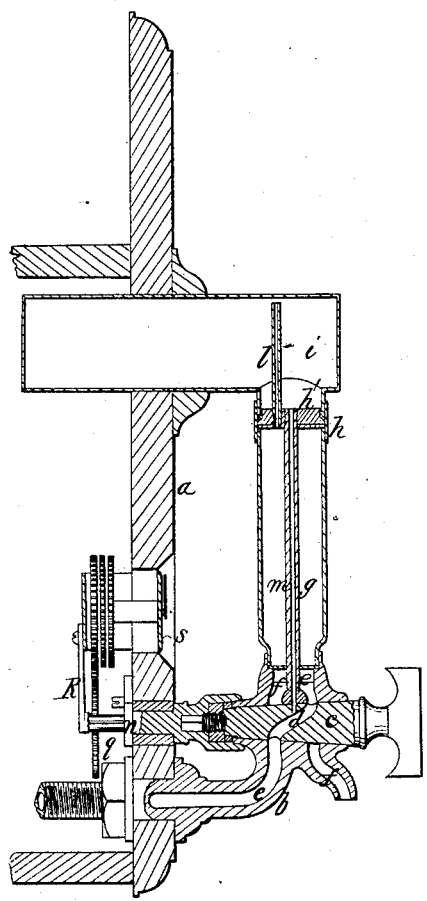
Fig. 1 represents a vertical section of the improved measuring apparatus.
Figure 2:
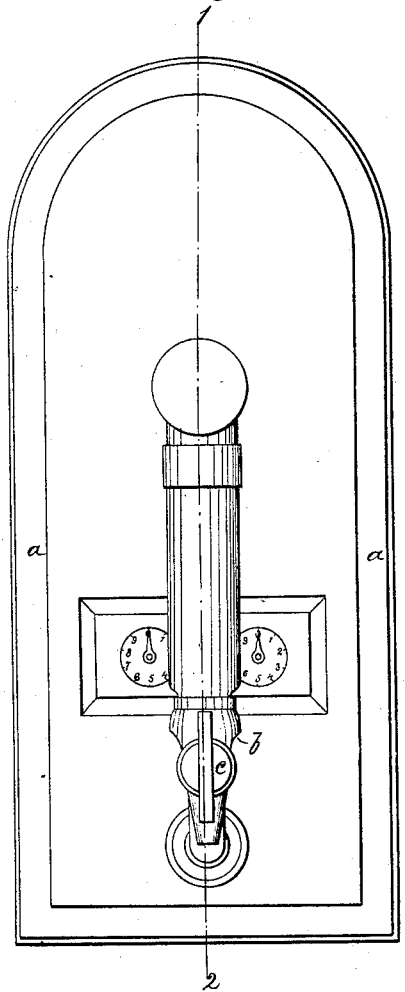
Fig. 2 is a front elevation of the same.

In both figures $a\ a$ is the frame work to which the apparatus is attached, $b$ is the tap, and $c$ the plug in which the passage or thoroughfare $d$ is constructed. This tap $b$ is supplied with the two thoroughfares, or passages, $e$ and $f$, both having a communication with the chamber or receptacle $g$ alternately, the top of which chamber $g$ fits into a collar $h$ which also receives the circular mouth-piece of a second chamber or receptacle $i$, usually of larger dimensions than the chamber $g$, both chambers being formed of glass or other suitable material.

The aforesaid collar $h$ has a partition $h'$ which forms a division between the two chambers, and is fitted with two tubes, $l$ and $m$, which form passages, the former for air, and the latter for liquor, to maintain a correct level of liquid in the chamber $i$, and also serving to connect the chamber $i$ with the body of the tap; $n$ is a ratchet-wheel secured on a spindle projecting from the plug $c$, a pinion $q$ projecting from the end of the spindle. When the plug of the tap is turned, this pinion transmits motion through the train of wheels R to the indicators on the dials $s$, and so registers the number of times the measure is filled and emptied.

The action of the apparatus will readily be understood with the assistance of the following description: The cask, or reservoir, of liquid being placed or fixed at a higher level than the tap, and connected therewith by a pipe, as usual, the plug $c$, when in the position shown in the drawing, allows the liquor to flow from the cask, or cistern, through the thoroughfare $e\ d\ e$ in its course to the receiver or chamber $g$; this chamber is suitably proportioned in size to contain a given quantity of liquid required to be measured, when full, from which chamber, during the time of filling, the air is discharged through the tube $l$ into the air-chamber or receptacle $i$, and if the pressure of liquid is still in excess of the pressure of air in the chamber, a portion of liquid rises into the chamber $i$ until an equilibrium is obtained; while the plug is in the position for filling, a passage in the plug is opposite the end of the tube $m$, which passage opens into the thoroughfare through the plug and forms a connection for the passage of liquor between the cask and the air-chamber, and adjusts the quantity of liquor in the air-chamber as the pressure of liquor varies. When it is required to discharge the contents of the receptacle $g$, or a portion thereof, the thoroughfare through the plug is reversed by rotating the plug, by which means the communication with the cask is closed, and the outlet $f d f$ is opened, through which the liquid in the measuring receptacle is discharged, the discharge being assisted by the pressure of air in the air-chamber. With the arrangement shown in the drawings, the plug will now have received one complete rotation, which, by its connection with the train of wheels R, has been registered on the dial of the indicator, a backward motion of the plug, beyond what is required for closing both passages, being prevented by a pawl falling into rachet-teeth cut in the collar $n$. By making the measuring chamber wholly or partially of a transparent material, and graduating the same, any required portion of the contents may be drawn off instead of the whole.

It will be seen that by the employment of the tubes $l$ and $m$, and the receptacle $i$, the necessity of using a tube communicating with the chamber $g$ and with the reservoir, above the liquor in the latter, is avoided.

I claim as my invention, and desire to secure by Letters Patent—

First. The chamber $g$, its openings $e$ and $f$, and two-way cock $c$, or their equivalents, in combination with the tubes $l\ m$ and receptacle $i$, the whole being constructed and arranged substantially as described.

Second. The combination of the above with the within described registering mechanism and dials.

In testimony whereof, I, the said Edward Kenworthy Dutton, have hereunto set my hand in the presence of two subscribing witnesses.

EDWARD K. DUTTON.

Witnesses:
 WM. DAVIES,
 R. R. ROTHWELL.